United States Patent
Ono et al.

(10) Patent No.: US 9,921,069 B2
(45) Date of Patent: Mar. 20, 2018

(54) MAP DATA CREATION DEVICE, AUTONOMOUS MOVEMENT SYSTEM AND AUTONOMOUS MOVEMENT CONTROL DEVICE

(75) Inventors: Yukihiko Ono, Tokyo (JP); Kenjiro Yamamoto, Tokyo (JP); Ryoko Ichinose, Tokyo (JP); Akira Oshima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 70 days.

(21) Appl. No.: 14/390,406

(22) PCT Filed: Apr. 5, 2012

(86) PCT No.: PCT/JP2012/059339
§ 371 (c)(1),
(2), (4) Date: Oct. 3, 2014

(87) PCT Pub. No.: WO2013/150630
PCT Pub. Date: Oct. 10, 2013

(65) Prior Publication Data
US 2015/0057871 A1     Feb. 26, 2015

(51) Int. Cl.
*G01C 21/34* (2006.01)
*G01C 21/32* (2006.01)
(Continued)

(52) U.S. Cl.
CPC ............ *G01C 21/34* (2013.01); *G01C 21/32* (2013.01); *G01C 21/3602* (2013.01); *G05D 1/0248* (2013.01); *G05D 1/0274* (2013.01)

(58) Field of Classification Search
CPC .... G01C 21/34; G01C 21/3602; G01C 21/32; G01C 21/206; G05D 1/0274; G05D 1/0248
See application file for complete search history.

(56) References Cited

U.S. PATENT DOCUMENTS 9,026,315 B2 * 5/2015 Anderson ............ G05D 1/0274
701/23
2010/0274481 A1  10/2010 Krishnaswamy et al.

FOREIGN PATENT DOCUMENTS

JP       10-300493 A    11/1998
JP       2004-110802 A   4/2004
(Continued)

OTHER PUBLICATIONS

Wikipedia, "Real Time Kinematic". Archived Feb. 28, 2012 (see attached PDF).*

(Continued)

*Primary Examiner* — Mussa A Shaawat
*Assistant Examiner* — Michael V Kerrigan
(74) *Attorney, Agent, or Firm* — Baker Botts L.L.P.

(57) ABSTRACT

The invention is intended to be able to generate map data even if a location not suited for identification of a matching position exists. A map data creation device creates map data, the map data being used for autonomous movement by a vehicle (1a), a vehicle (1b) and/or other vehicles (1), based on a relative position of the vehicle (1b) which exists around the vehicle (1a), relative to the vehicle (1a), the relative position being measured by the vehicle (1a), and object shape data of an object which exists around the vehicle (1b), the object shape being measured by the vehicle (1b). Moreover, the relative position of the vehicle (1b) relative to the vehicle (1a) is calculated based on the object shape data measured by the vehicle (1a).

26 Claims, 11 Drawing Sheets

(51) Int. Cl.
    *G01C 21/36*     (2006.01)
    *G05D 1/02*     (2006.01)

(56)     References Cited

FOREIGN PATENT DOCUMENTS

| | | |
|---|---|---|
| JP | 2007-233864 A | 9/2007 |
| JP | 2008-276348 A | 11/2008 |
| JP | 2009-149194 A | 7/2009 |
| JP | 2009-276927 A | 11/2009 |
| JP | 2011-108084 A | 6/2011 |
| WO | 2006/137545 A1 | 12/2006 |

OTHER PUBLICATIONS

Andersson, David. "Vehicle Positioning with Map Matching Using Integration of a Dead Reckoning System and GPS". Published Feb. 26, 2004 (see attached PDF).*

Notification of Reasons for Refusal, dated Nov. 24, 2015, which issued during the prosecution of Japanese Patent Application No. 2014-508967, which corresponds to the present application (a full translation attached).

Canadian Office Action, dated Nov. 30, 2016, which issued during the prosecution of Canadian Application No. 2,869,374, which corresponds to the present application.

* cited by examiner

MAP DATA CREATION DEVICE, AUTONOMOUS MOVEMENT SYSTEM AND AUTONOMOUS MOVEMENT CONTROL DEVICE

TECHNICAL FIELD

The present invention relates to a technique for a map data creation device, an autonomous movement system and an autonomous movement control device that are adapted to perform an autonomous movement based on a matching of object shape data with map data.

BACKGROUND ART

Conventionally, an autonomous movement system is disclosed which estimates a self-position and moves according to a target path, with reference to map data responding to real environment, based on data of measurement devices (internal sensor and/or external sensor) installed in a moving object indoors and/or outdoors (see Patent Literatures 1, 2).

An autonomous movement system described in Patent Literature 1 sequentially performs matching of shape data of a peripheral object (hereinafter referred to as object shape data) acquired by a measurement device (distance sensor as an external sensor) at the current time, with object shape data acquired at a different location from the actual location at one previous time. Then, the autonomous movement system synthesizes the object shape data based on a result of the matching. Further, the autonomous movement system repeats synthesis of the object shape data to thereby generate map data.

Patent Literature 2 describes a technique in which landmarks serving as marks are placed in a travel environment and autonomous travel is performed while these landmarks are recognized with cameras.

CITATION LIST

Patent Literature

Patent Literature 1: Japanese Patent Application Publication No. 2008-276348
Patent Literature 2: Japanese Patent Application Publication No. 2004-110802

SUMMARY OF INVENTION

Technical Problem

When the technique described in Patent Literature 1 is used, a zone in which there is no existing object having such a shape as can be used for matching exists in an outdoor travel environment in some cases. The zone in which there is no existing object having a shape such as can be used for matching means, for example, a zone in which a straight road continues, a zone in which there is no distinguishing object existing in the vicinity, such as a field, and the like. In such zones, even if the autonomous movement apparatus performs matching, a self-position by the matching cannot be identified and thus map data cannot be created. To cope with this, the autonomous movement apparatus is required in such zones to use other approaches so as to assist identification of a matching position and piece together previous and next object shape data. Here, the other approaches include using an approach described in Patent Literature 2, an odometry, an inertial sensor called an IMU (Inertial Measurement Unit), a gyro sensor, a GNSS (Global Navigation Satellite System) or the like. However, measurement using the odometry and/or IMU has a possibility that an error may be increased and accumulated with movement of a moving object. On the other hand, measurement using the GNSS makes it difficult to generate map data depending on locations because of satellite visibility, i.e., because it cannot be used in doors or the like.

The present invention has been made in view of such background and the present invention is intended to be able to assist generation of map data even if a location not suited for identification of a matching position exists.

Solution to Problem

In order to solve the above problems, the present invention provides creating map data, the map data being used for autonomous movement by a first autonomous movement apparatus, a second autonomous movement apparatus and/or other autonomous movement apparatuses, based on position data of the second autonomous movement apparatus which exists around the first autonomous movement apparatus, the position being measured by the first autonomous movement apparatus, and object shape data of an object which exists around the second autonomous movement apparatus, the object shape being measured by the second autonomous movement apparatus.

Advantageous Effects of Invention

The present invention makes it possible to assist generation of map data even if a location not suited for identification of a matching position exists.

DESCRIPTION OF EMBODIMENTS

Next, the mode for carrying out the present invention (hereinafter referred to as "embodiment") will be described in detail with reference to the drawings as appropriate. Note that, in each figure, the same component will be given the same reference sign and description thereof will be omitted.

<<System Configuration>>

Figure 1:
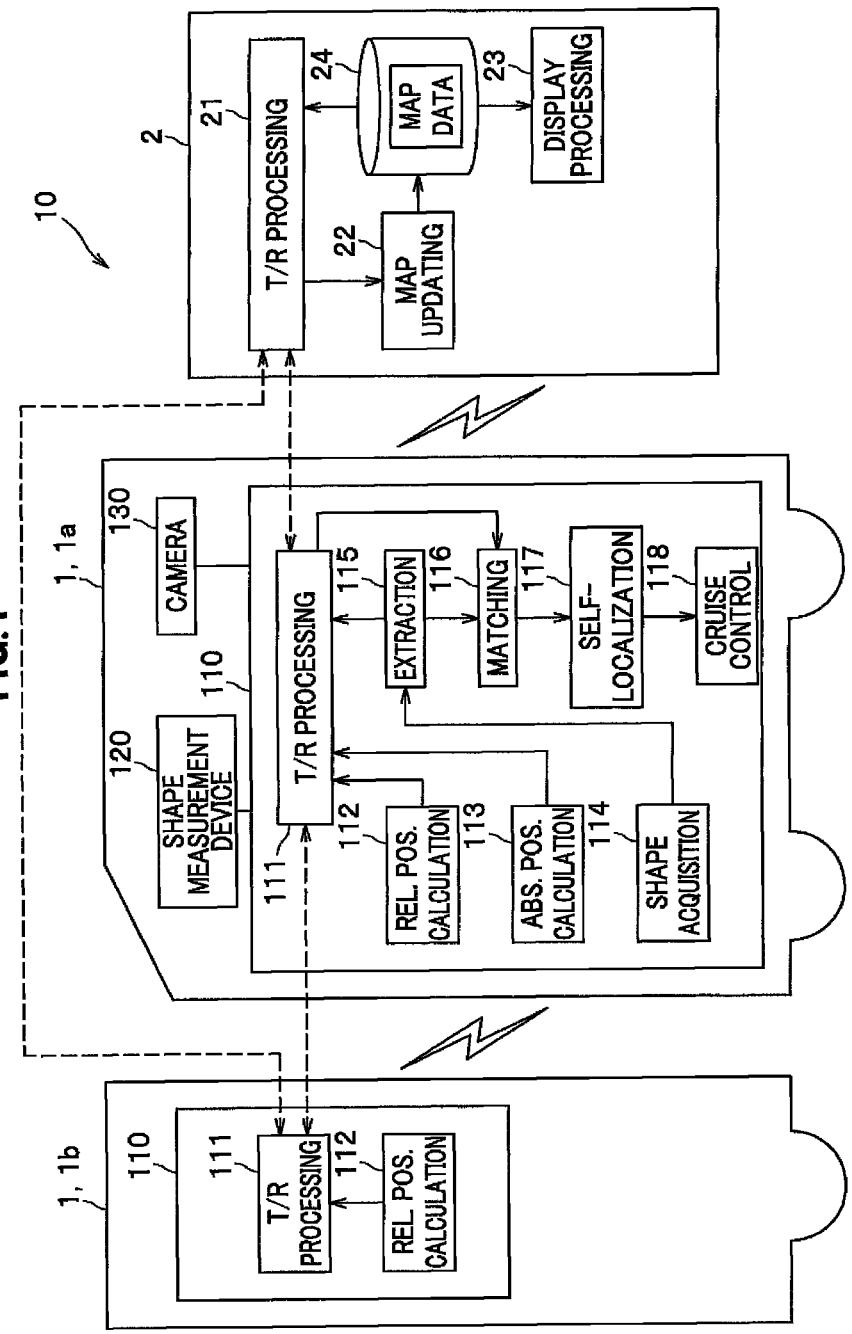
FIG. 1 is a diagram illustrating a system configuration example of an autonomous movement system according to an embodiment.

FIG. 1 is a diagram illustrating a system configuration example of an autonomous movement system according to an embodiment.

An autonomous movement system 10 is an autonomous movement apparatus and includes a plurality of vehicles 1 (1a, 1b) that are capable of communicating with one another, and a management device 2 that is a map data creation device. Note that, although the number of the vehicles 1 is two in the present embodiment, it may be more than two.

The vehicle 1 mounts thereon an in-car device (autonomous movement control device) 110 that performs acquisition of object shape data, measurement of an absolute position of the self, calculation of a relative position and the like (details of its configuration will be described later), a shape measurement device 120 such as a laser scanning device, and a camera 130.

Note that, although details will be described later, the vehicle 1 performs autonomous travel based on matching of object shape data measured by the shape measurement device 120 with map data.

The shape measurement device 120 is a device that measures shapes of a stationary object such as a building, a tree or a terrain of hills and cliffs, and of a moving object such as a vehicle other than the self vehicle 1, a pedestrian, a bicycle or an animal. Measured results are transmitted as the object shape data to a shape acquisition unit 114. The camera 130 is an optical camera and details thereof will be described later.

Moreover, the management device 2 is capable of communicating with each vehicle 1 and generates map data based on object shape data, an absolute position and a relative position which are acquired from the vehicle 1.

Here, the absolute position is a position in the absolute coordinate system and the relative position is a position in a coordinate system in which an arbitrary vehicle 1 is placed at the origin of coordinates.

(Configuration of in-Car Device)

The in-car device 110 includes a transmitting/receiving (T/R) processing unit (transmitting unit, receiving unit) 111, a relative position (REL.POS.) calculation unit (other-position measurement unit) 112, an absolute position (ABS-.POS.) calculation unit (self-position measurement unit) 113, a shape acquisition unit (peripheral object shape measurement unit) 114, an extraction unit 115, a matching unit 116, a self-position (SELF-POS.) estimation unit 117, and a cruise control unit 118.

The T/R processing unit 111 performs transmission and reception of information to and from the other vehicle 1 and the management device 2.

The relative position calculation unit 112 calculates a relative position of the other vehicle 1 (1b) observed from the self vehicle 1 (1a) while the other vehicle 1 (1b) performs measurement of object shape data.

The absolute position calculation unit 113 measures or calculates an absolute position of the self vehicle 1.

The shape acquisition unit 114 acquires object shape data from a laser scanning device.

The extraction unit 115 extracts a stationary object and a moving object in parts from the acquired object shape data. The extraction unit 115 superimposes a plurality of measured shapes at different times from past before a given time to present, calculates their appearance frequencies to separate a stationary object from a moving object, and extracts respective object shape data of the stationary object and the moving object.

The matching unit 116, the self-localization unit 117 and the cruise control unit 118 are parts that operate when the self vehicle 1 performs autonomous movement, not in generation of map data.

The matching unit 116 performs matching of the object shape data of the stationary object extracted by the extraction unit 115, with the map data received from the management device 2.

The self-localization unit 117 estimates a position of the self vehicle 1 (self-position), using a result of the matching. The matching in the matching unit 116 and the estimation of self-position in the self-localization unit 117 can be performed, for example, using a method described in a reference literature (Takeshi Masuda, Ikuko (Shimizu) Okatani, and Ryusho Sagawa, "Range Data Processing-Technique of Shape Model Generation from Multiple Range Images", Proc. of the 146th CVIM, p. 105-p. 116, 2004).

Moreover, the self-localization unit 117 may combine the self-position acquired by the absolute position calculation unit 113 with the self-position estimated by means of matching, using Kalman filter or the like, to produce one self-position.

The cruise control unit 118 controls autonomous travel by driving wheels and the like of the vehicle 1, based on the self position estimated by the self-localization unit 117 and a predetermined target path. The cruise control unit 118 controls the self vehicle 1 to travel to the destination according to the predetermined target path. Note that the form of movement by crawlers or legs, not by the wheels, may be used.

Note that, for simplification of the drawings and description, as for the vehicle 1b, only the T/R processing unit 111 and the relative position calculation unit 112 are described in FIG. 1 and the other configurations are omitted, but in fact, the vehicle 1b has a similar configuration to the vehicle 1a.

Each of the units 111 to 118 in the in-car device 110 is embodied by developing programs stored in a ROM (Read Only memory) or the like to a RAM (Random Access Memory) and executing the programs by means of a CPU (Central Processing Unit).

(Management Device)

The management device 2 includes a transmitting/receiving (T/R) processing unit 21, a map updating unit 22, a display processing unit 23 and a map data storage unit 24.

The T/R processing unit 21 performs transmission and reception of information to and from each vehicle 1.

The map updating unit 22 projects on map data, object shape data of a stationary object and information on a moving object which are transmitted from the vehicle 1, and updates object shape data of the stationary object and object shape data of the moving object in the map data while storing and learning an appearance frequency of the moving object at each location on the map data.

The display processing unit 23 is a unit that displays information for an operator of the management device 2. The display processing unit 23 displays on a display (not shown) information on the map data updated by the map updating unit 22 and information on the self-position of the vehicle 1 estimated by the self-localization unit 117.

The management device 2 is a PC (Personal Computer) or the like, and each of the units 21 to 23 in the management device 2 is embodied by developing programs stored in a ROM, a HD (Hard Disk) or the like to a RAM and executing the programs by means of a CPU.

<<Map Data Generation Processing>>

A description will be given of steps of a map data generation processing according to the present embodiment.

In the map data generation processing according to the present embodiment, at least one of the vehicles is in a stopped state and at least one of the other vehicles is moving to measure object shape data. Hereinafter, the vehicle 1a is referred to as a stopped vehicle (first autonomous movement apparatus) 1a and the vehicle 1b is referred to as a mobile vehicle (second autonomous movement apparatus) 1b.

(Map Data Generation Processing)

Figure 2:
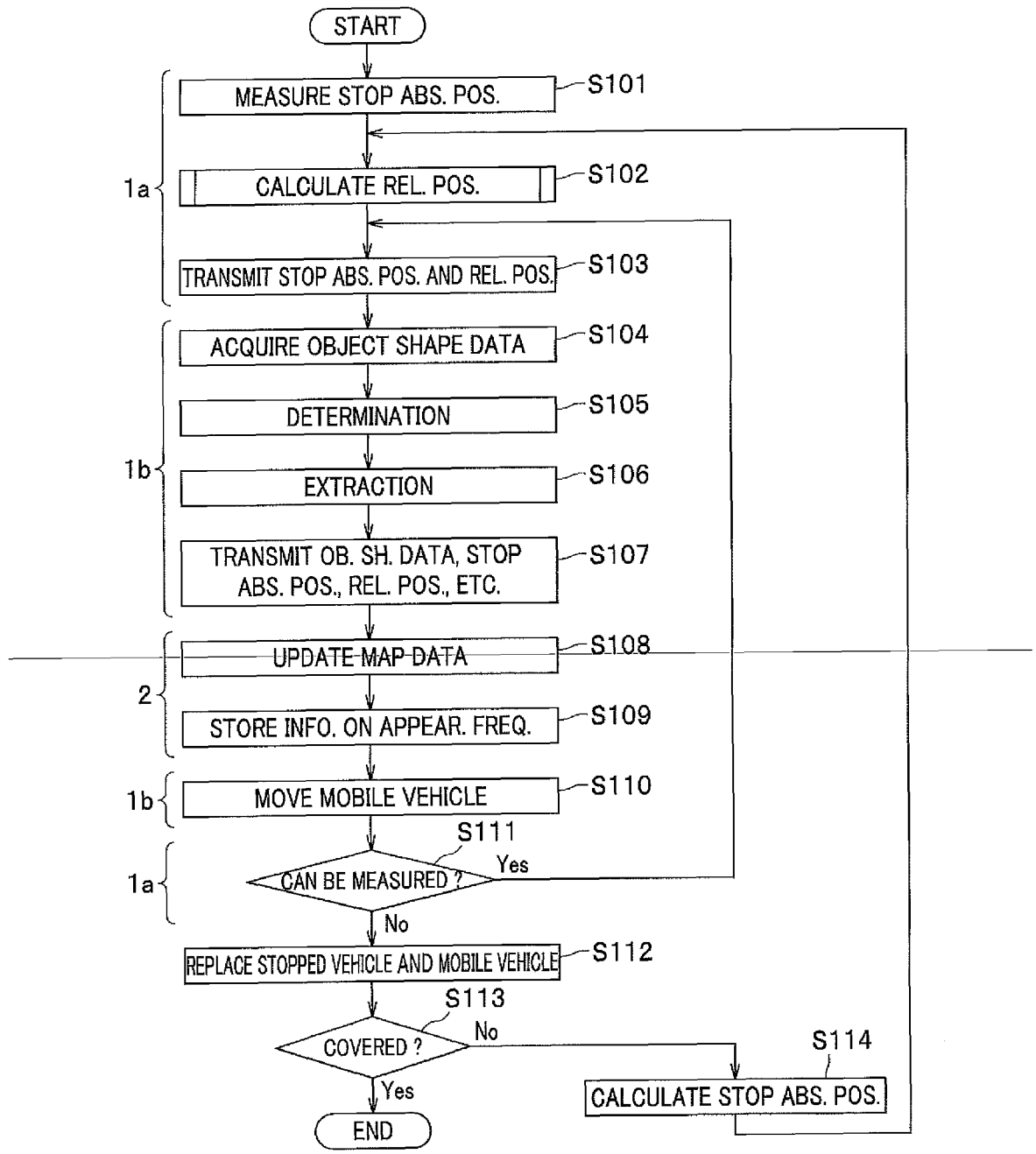
FIG. 2 is a flowchart representing steps of a map data generation processing according to the embodiment.

FIG. 2 is a flowchart representing steps of the map data generation processing according to the present embodiment.

In the autonomous movement system 10, the processing in the flowchart shown in FIG. 2 is executed, thereby allowing highly accurate map data to be created even in locations where there are few objects having such a shape as can be used for matching. This makes it possible for the vehicle 1, when performing autonomous movement, to perform highly accurate self-localization to reach the destination.

First, the absolute position calculation unit 113 of the stopped vehicle 1a measures a position in the absolute coordinate system (hereinafter referred to as a stop absolute position), of the stopping self (S101). At this time, a spot whose position can be accurately measured or a spot whose position is known is set as the position at which the stopped vehicle 1a is stopping. For example, a spot at which visibility of the GNSS satellites is good can be set.

Figure 3:
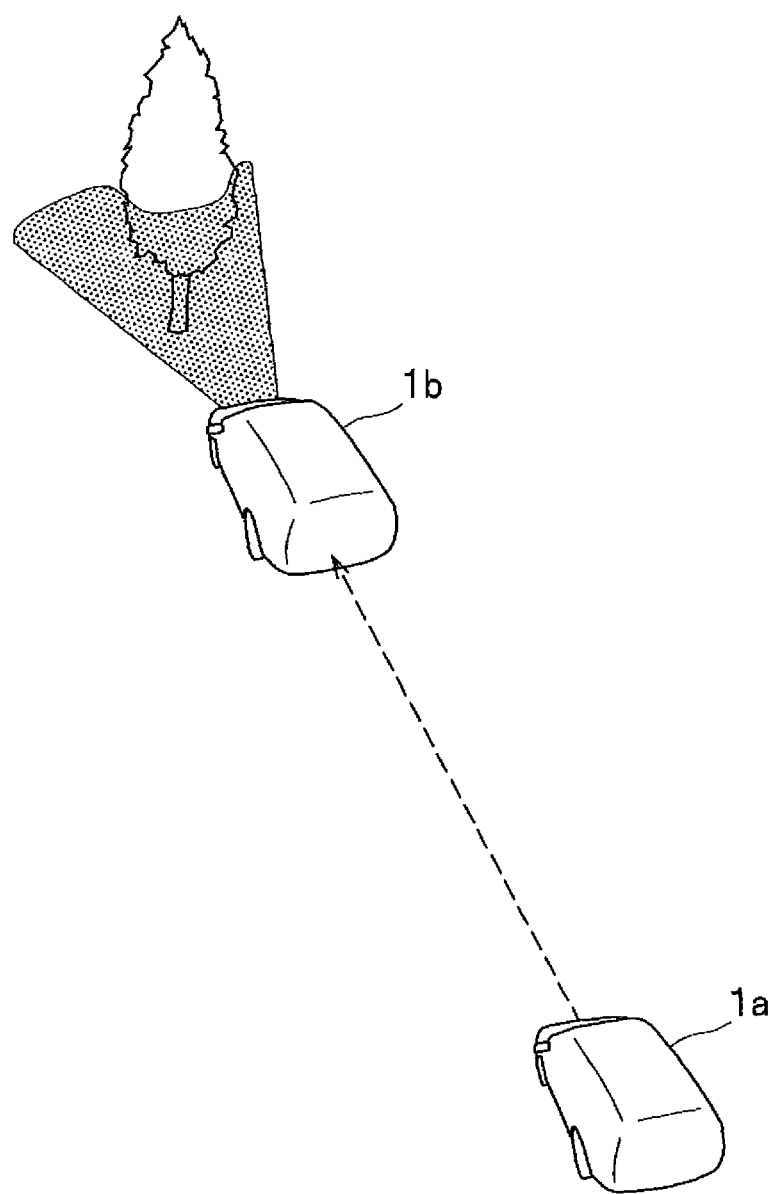
FIG. 3 is a diagram illustrating a state of relative position calculation of a mobile vehicle, by a stopped vehicle.

Next, as illustrated in FIG. 3, the relative position calculation unit 112 of the stopped vehicle 1a calculates a relative position of the mobile vehicle 1b relative to the stopped vehicle 1a (S102). The processing of step S102 will be described later with reference to FIG. 7.

Then, the T/R processing unit 111 of the stopped vehicle 1a transmits (1) the stop absolute position, and (2) the relative position of the mobile vehicle 1b, with time stamps, to the mobile vehicle 1b (S103).

Subsequently, the shape acquisition unit 114 of the mobile vehicle 1b acquires three-dimensional shape data of objects (hereinafter referred to as object shape data) within the measurement range from the shape measurement device 120 (S104).

Next, the extraction unit 115 of the mobile vehicle 1b determines a stationary object and a moving object in the object shape data acquired at step S104 (S105), and extracts respective object shape data of the stationary object and the moving object from the acquired object shape data (S106). For example, the extraction unit 115 calculates an appearance frequency of the object from the object shape data at a plurality of times. Then, the extraction unit 115 determines an object whose appearance frequency is lower than a predetermined value, as a moving object, and determines an object whose appearance frequency is higher than the predetermined value, as a stationary object (see PCT/JP2011/076961). Note that for determination of a stationary object and a moving object, methods other than the above may be used.

Then, the T/R processing unit 111 of the mobile vehicle 1b transmits via a wireless network or the like to the management device 2, the extracted respective object shape data of the stationary object and the moving object, and information on the stop absolute position, the relative position of the mobile vehicle 1b relative to the stopped vehicle 1a, the appearance frequency and the position of the moving object (S107). Note that at step S107, the T/R processing unit 111 of the mobile vehicle 1b may transmit only the object shape data of the stationary object to the management device 2.

The map updating unit 22 of the management device 2 which has received the information transmitted at step S107 uses the transmitted object shape data of the stationary object and the moving object to update the object shape data of the stationary object in the map data, thereby updating the map data (S108).

Then the map updating unit 22 stores therein the appearance frequency of the moving object in the map data (S109).

Figure 4:
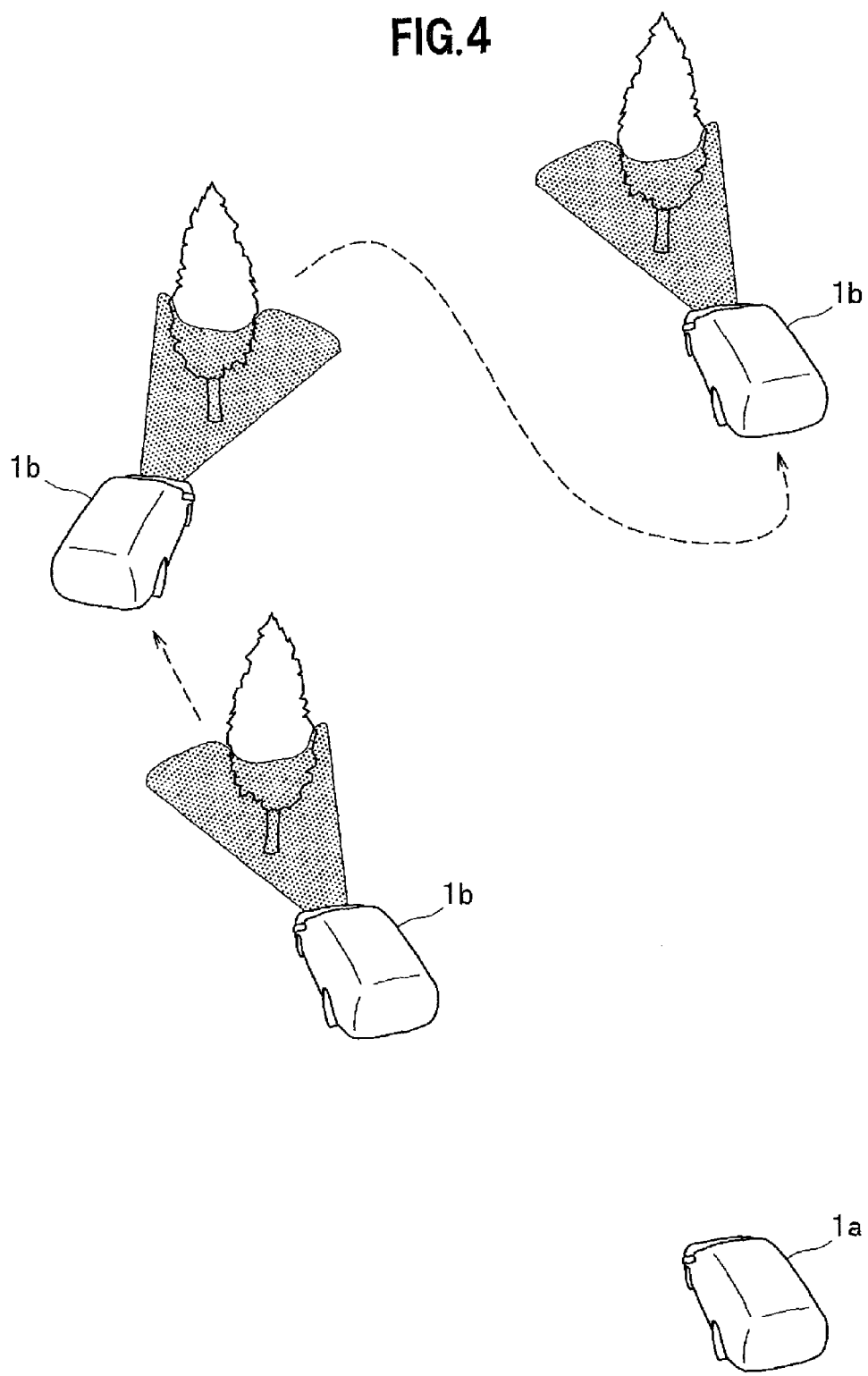
FIG. 4 is a diagram illustrating a state of object shape data measurement by a mobile vehicle.

Subsequently, as illustrated in FIG. 4, the cruise control unit 118 of the mobile vehicle 1b causes the mobile vehicle 1b to move to the next object shape data measurement position (S110).

Then, the relative position calculation unit 112 of the stopped vehicle 1a determines whether or not the relative position of the mobile vehicle 1b which has moved can be measured (S111). More specifically, the relative position calculation unit 112 of the stopped vehicle 1a detects that the mobile vehicle 1b has reached outside a measurable range of the shape measurement device 120 (for example, outside a laser reaching range), or the mobile vehicle 1b has turned a corner to thereby get out of sight of the stopped vehicle 1a, and thus performs the processing of step S111.

When a result of step S111 indicates that the relative position can be measured (S111→Yes), the in-car devices 110 of the stopped vehicle 1a and the mobile vehicle 1b return the processing to step S102.

When a result of step S111 indicates that the relative position cannot be measured (S111→No), the mobile vehicle 1b returns to a position at which the relative position can be measured and then the stopped vehicle 1a and the mobile vehicle 1b are replaced with each other (S112). That is, the vehicle which has been heretofore the stopped vehicle 1a becomes a mobile vehicle, and the vehicle which has been heretofore the mobile vehicle 1b becomes a stopped vehicle.

Then, the map updating unit 22 of the management device 2 determines whether or not all the regions in the moving regions of the vehicle 1 are covered in the map data (S113).

Figure 5:
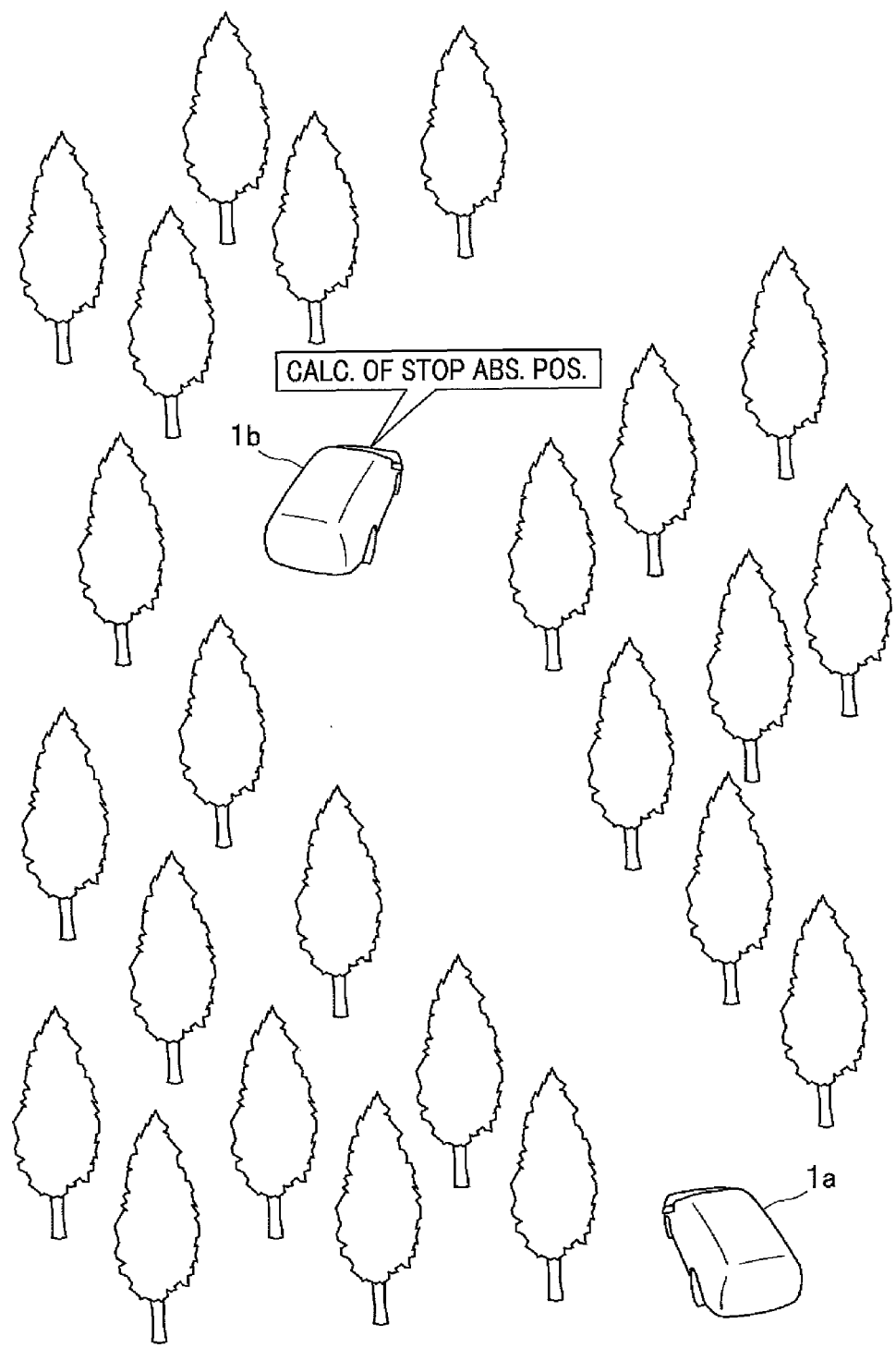
FIG. 5 is a diagram illustrating a state of stop absolute position calculation by a vehicle that has newly become a stopped vehicle.

When a result of step S113 indicates that all the regions are not covered (S113→No), the absolute position calculation unit 113 of the vehicle 1b that has newly become a stopped vehicle calculates a stop absolute position of the self based on the stop absolute position of the stopped vehicle 1a before replacement as illustrated in FIG. 5, and the relative position of the mobile vehicle 1b (S114).

Then, the processing unit of the mobile vehicle 1b and the processing unit of the stopped vehicle 1a return the processing to step S102.

Figure 6:
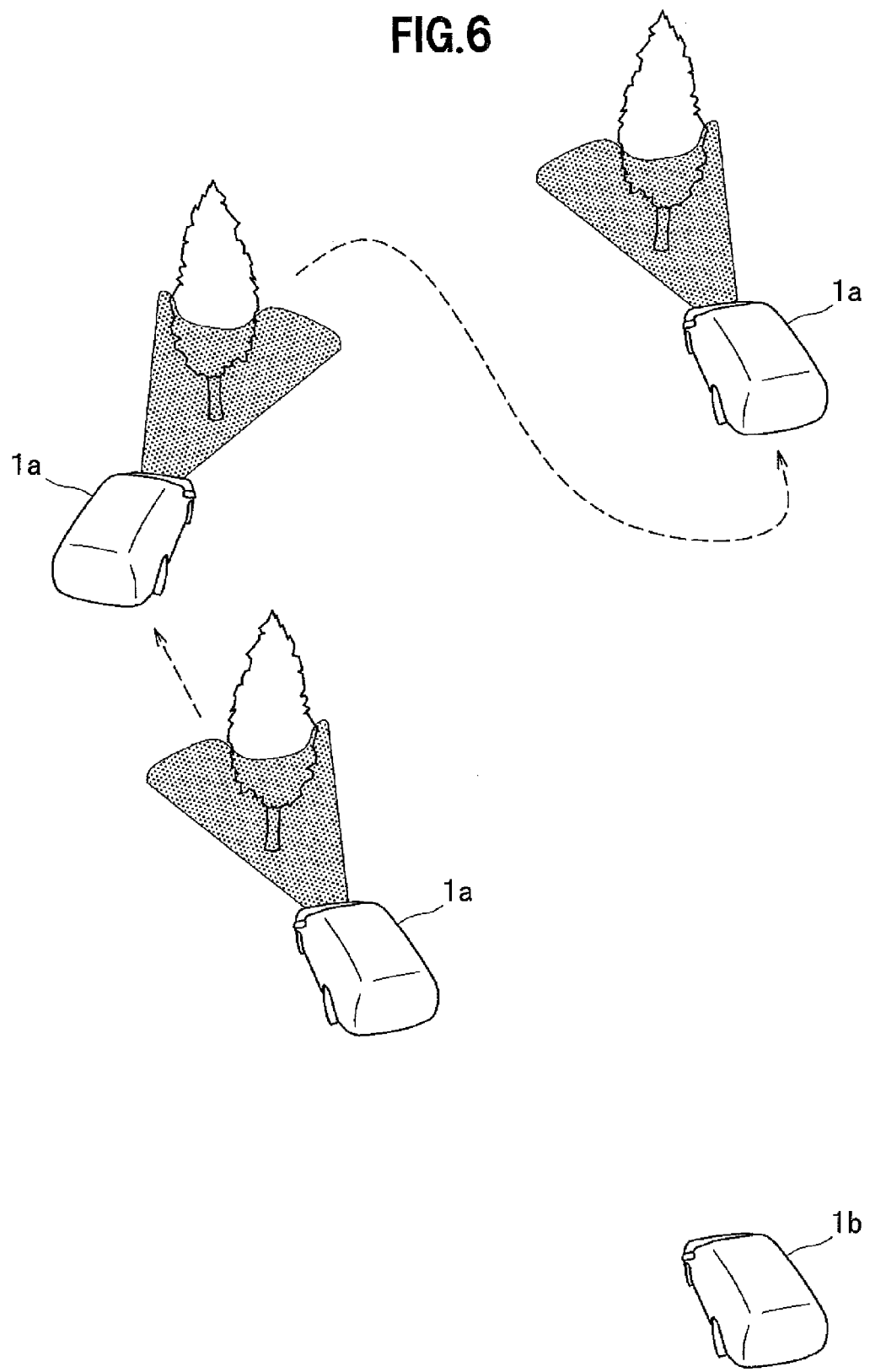
FIG. 6 is a diagram illustrating a state of object shape data measurement by a vehicle that has newly become a mobile vehicle.

Thereafter, as illustrated in FIG. 6, the vehicle which has been heretofore the stopped vehicle 1a becomes a mobile vehicle, and the vehicle which has been heretofore the mobile vehicle 1b becomes a stopped vehicle, and the processings of steps S103 to S111 are performed to proceed with updating of the map data.

When a result of step S113 indicates that all the regions are covered (S113→Yes), the autonomous movement system 10 finishes the processing.

Note that in this example, the description is given of the case where two vehicles 1 are used, but in the case of three or more vehicles, for example, each vehicle becomes a stopped vehicle in sequence. Moreover, when a plurality of mobile vehicles exist, a stopped vehicle calculates a relative position of each mobile vehicle.

(Relative Position Calculation Processing)

Figure 7:
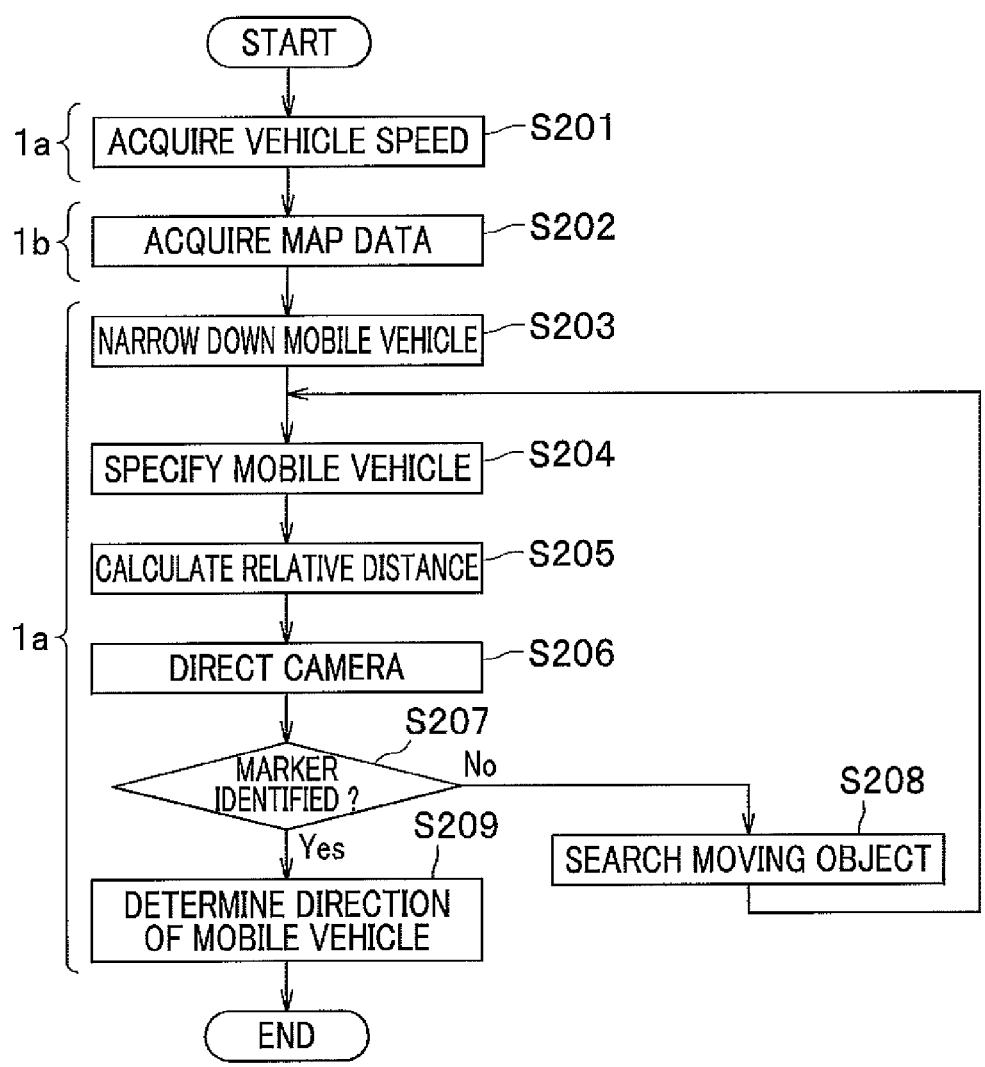
FIG. 7 is a flowchart representing steps of a relative position calculation processing according to the embodiment.

FIG. 7 is a flowchart representing steps of a relative position calculation processing according to the present embodiment. Note that the processing in FIG. 7 is for explaining the processing of step S102 in FIG. 2 in detail.

Here, a description will be given of the case where the vehicle 1a is a stopped vehicle and the vehicle 1b is a mobile vehicle.

First, the relative position calculation unit 112 of the stopped vehicle 1a receives a vehicle speed of the mobile vehicle 1b via a wireless network or the like from the mobile vehicle 1b (S201).

Next, the relative position calculation unit 112 of the stopped vehicle 1a acquires map data around the mobile vehicle 1b together with information on moving objects (appearance frequencies and positions of the moving objects) (S202). Note that the map data at this time is map data which is being created.

Then the relative position calculation unit 112 of the stopped vehicle 1a narrows down a candidate of the mobile vehicle 1 from among moving objects (S203). More specifically, the relative position calculation unit 112 of the stopped vehicle 1a narrows down moving objects from the object shape data at a plurality of times and simultaneously calculates a moving speed of each moving object. Moreover, the relative position calculation unit 112 of the stopped vehicle 1a narrows down a moving object whose speed approximates the vehicle speed received at step S201, based on the calculated moving speed of each moving object, to thereby narrow down the mobile vehicle 1.

Subsequently, the relative position calculation unit 112 of the stopped vehicle 1a compares shape data (CAD (Computer Aided Design) data or the like) of the mobile vehicle 1b which is acquired in advance, with shapes acquired from the object shape data in the moving objects narrowed down at step S203, and specifies a matched moving object as the mobile vehicle 1b (S204).

Then, the relative position calculation unit 112 of the stopped vehicle 1a calculates a relative distance between the moving object specified as the mobile vehicle 1b, and the stopped vehicle 1a itself (S205).

Next, the relative position calculation unit 112 of the stopped vehicle 1a causes the camera 130 to be directed to a direction of the moving object specified at step S204 (S206).

Then, the relative position calculation unit 112 of the stopped vehicle 1a performs image processing to determine whether or not a marker which is provided in advance in the mobile vehicle 1b can be identified from images taken by the camera 130 (S207). The marker is one that can identify the vehicle 1 provided with the mark as the mobile vehicle 1b, such as a reflective plate, a color and/or shape of the vehicle 1b.

Figure 8:
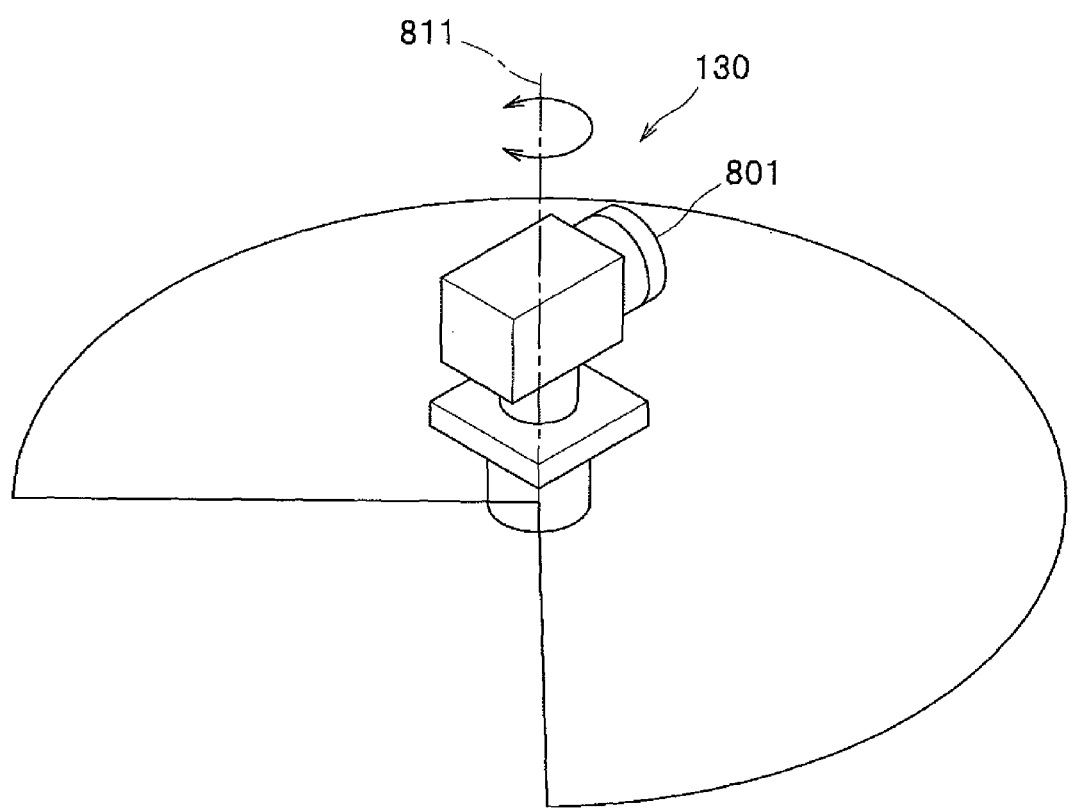
FIG. 8 is a diagram illustrating a configuration example of a camera according to the embodiment.

FIG. 8 is a diagram illustrating a configuration example of a camera according to the present embodiment.

The camera 130 is provided with a zoom lens 801 that can be controlled by the relative position calculation unit 112 (FIG. 1). The relative position calculation unit 112 can control the camera 130 to rotate around a yaw axis 811. With this rotational control, the relative position calculation unit 112 directs the camera 130 to the direction of the moving object 1b and acquires detailed images of the mobile vehicle 1b. Then, the relative position calculation unit 112 detects a rotational angle with a high degree of accuracy to measure a direction of the mobile vehicle 1b relative to the self vehicle with a high degree of accuracy.

A description will be given with reference back to FIG. 7.

When a result of step S207 indicates that the marker cannot be identified (S207→No), the relative position calculation unit 112 of the stopped vehicle 1a searches a moving object whose moving speed approximates the vehicle speed received at step S201 (S208), and returns the processing to step S204.

When a result of step S207 indicates that the marker can be identified (S207→Yes), the relative position calculation unit 112 of the stopped vehicle 1a determines the direction of the camera 130 as the direction of the mobile vehicle 1b (S209). By these processings, the distance and direction of the mobile vehicle 1b relative to the stopped vehicle 1a are calculated.

(Outline of Relative Position Calculation Processing)

Figure 9:
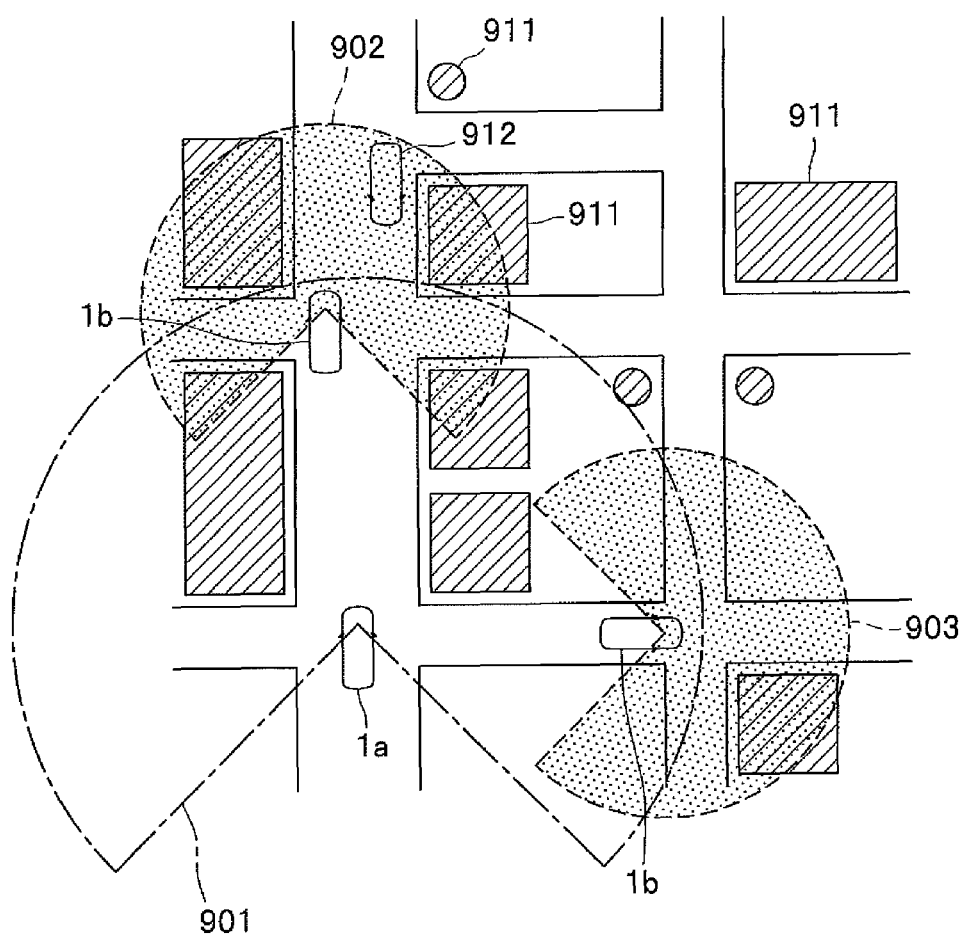
FIG. 9 is a diagram for explaining an outline of the relative position calculation processing according to the embodiment.

FIG. 9 is a diagram for explaining an outline of the relative position calculation processing according to the embodiment.

Sign 901 denotes a measurable range by the shape measurement device 120 (FIG. 1) in the stopped vehicle 1a, and sign 902 denotes a measurable range by the shape measurement device 120 in the mobile vehicle 1b. Moreover, sign 1b1 denotes the mobile vehicle 1b after movement, and sign 903 denotes a measurable range by the shape measurement device 120 in the mobile vehicle 1b at the position indicated by sign 1b1.

Note that sign 911 denotes a stationary object and sign 912 denotes a moving object other than the mobile vehicle 1b.

The relative position calculation unit 112 of the stopped vehicle 1a detects the mobile vehicle 1b from the object shape data measured by the shape measurement device 120, and calculates the distance of the mobile vehicle 1b based on the object shape data to calculate the relative distance of the mobile vehicle 1b (FIG. 7, S205). Moreover, the relative position calculation unit 112 calculates the direction of the mobile vehicle 1b relative to the stopped vehicle 1a based on the marker which is provided in the mobile vehicle 1b (FIG. 7, S209). This makes it possible to calculate the relative position of the mobile vehicle 1b. When the mobile vehicle 1b receives from the stopped vehicle 1a the calculated relative position of the self relative to the stopped vehicle 1a, it acquires, as the object shape data, shapes of objects within the measurement range 902 and the measurement range 903 by the shape measurement device 120 provided in the self. Then, when the extraction unit 115 of the mobile vehicle 1b extracts respective object shape data of the stationary object and the moving object from the acquired object shape data (FIG. 2, S106), the T/R processing unit 111 transmits to the management device 2, information on the stationary object and the moving object which includes the extracted respective object shape data of the stationary object and the moving object, the stop absolute position of the stopped vehicle 1a transmitted from the stopped vehicle 1a, and the relative position of the self (FIG. 2, S107). The management device 2 updates the map data based on the transmitted information (FIG. 2, S108).

Note that when the mobile vehicle 1b moves out of the measurement range 901, the stopped vehicle 1a determines that the relative position of the mobile vehicle 1b cannot be measured (FIG. 2, S111→No), and the stopped vehicle and the mobile vehicle are replaced with each other (S112).

(Autonomous Movement Processing)

Figure 10:
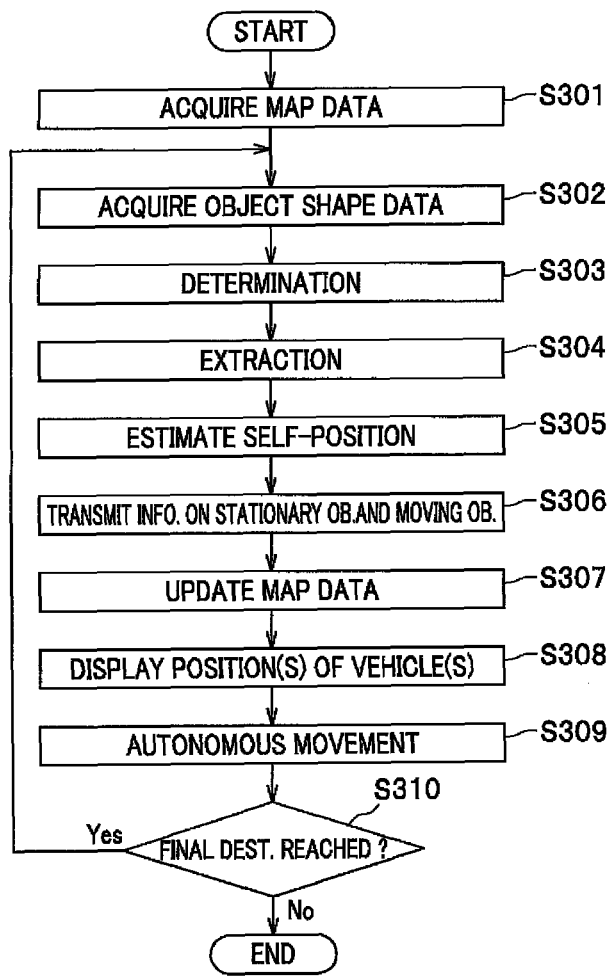
FIG. 10 is a flowchart representing steps of an autonomous movement processing for the vehicle according to the embodiment.

FIG. 10 is a flowchart representing steps of an autonomous movement processing for the vehicle according to the embodiment.

First, when an autonomous movement processing for the vehicle 1 is started, the matching unit 116 acquires map data from the management device 2 (S301).

Then, while the vehicle 1 travels in a traveling environment which is the target of travel, the shape measurement device 120 measures three-dimensional shapes of objects (inclusive of both a stationary object and a moving object) which exist around the vehicle 1, and the shape acquisition unit 114 acquires object shape data of the peripheral objects around the vehicle 1 (S302).

Figure 11:
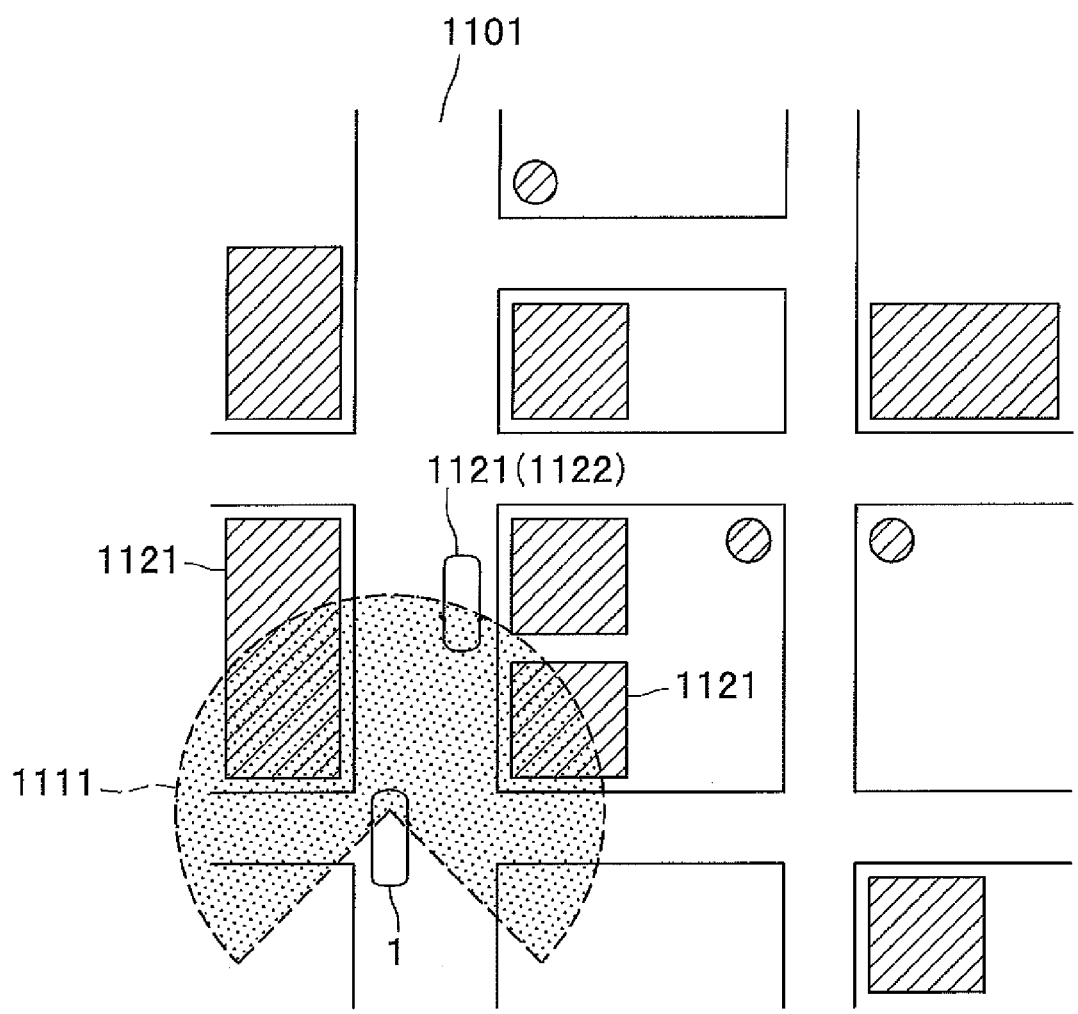
FIG. 11 is a diagram illustrating a state of object shape data measurement by a vehicle that is performing an autonomous movement.

As illustrated in FIG. 11, the vehicle 1 traveling on a travelable area (road) 1101 measures a three-dimensional shape of an object 1121 included in a measurement range 1111 of the shape measurement device 120. Object shape data measured includes both object shape data of a stationary object such as a building and object shape data of a moving object 1122 such as another vehicle 1.

A description will be given with reference back to FIG. 10.

Next the extraction unit 115 uses a plurality of object shape data at different times from past before a given time to present, to determine a stationary object and a moving object (S303), and extracts respective object shape data of the stationary object and the moving object from the plurality of object shape data (S304). As for methods for determination and extraction of the stationary object and the moving object, similar methods to steps S105 and S106 in FIG. 2 are used.

Subsequently, the matching unit 116 performs matching of the object shape data of the stationary object extracted at step S304, with the map data acquired at step S301, and estimates a self-position of the vehicle 1 itself (S305). Here, since the matching unit 116 performs matching of only the object shape data of the stationary object other than the moving object with the map data, highly accurate self-localization can be realized even in a travel environment in which moving objects exist.

Note that, for the matching at step S305, for example, a matching method described in a reference literature (Szymon Rusinkiewicz, and Marc Levoy, "Efficient Variants of the ICP Algorithm", Proc. of International Conference on 3-D Digital Imaging and Modeling, p. 145-p. 152, 2001) is used, thereby making it possible to realize highly accurate self-localization even in a travel environment in which moving objects exist.

Next, the T/R processing unit 111 transmits the object shape data of the stationary object determined and extracted by the extraction unit 115, and information on the appearance frequency and coordinates on the map data of the moving object, positional coordinates of the self vehicle estimated at step S305, and the like (information on stationary objects and moving objects) via a wireless network or the like to the map updating unit 22 of the management device 2 (S306).

The map updating unit 22 uses the information on stationary objects and moving objects transmitted at step S306, to update the appearance frequency of the moving object at each location on the map data and update the object shape data of the stationary object in the map data (S307). This makes it possible to bring the map data and the appearance frequency of the moving object up to date at all times.

Subsequently, the display processing unit 23 of the management device 2 causes a display (not shown) to display a position of the vehicle 1 (or positions of a plurality of vehicles) on the map data (S308). Here, it is desirable that information of the map data to be displayed is map data which is updated by the map updating unit 22 in the processing of step S307. Moreover, the position of the vehicle 1 to be displayed is the self-position of the vehicle 1 estimated by the matching at step S305. Note that the processing of step S308 can be omitted.

Then, the cruise control unit 118 of the vehicle 1 causes the vehicle 1 to perform autonomous movement to travel to the destination according to the predetermined target path, based on the self-position of the vehicle 1 estimated at step S305 (S309). The processing of step S309 can be performed, for example, using a method described in a reference literature (Jun Ota, Daisuke Kurabayashi, and Tamio Arai, "Introduction to Intelligent Robots", CORONA PUBLISHING CO., LTD., 2001, ISBN: 978-4-339-04553-6).

Subsequently, the cruise control unit 118 determines whether or not the final destination is reached (S310).

When a result of step S310 indicates that the final destination is not reached (S310→No), the in-car device 110 returns the processing to step S302.

When a result of step S310 indicates that the final destination is reached (S310→Yes), the in-car device 110 finishes the autonomous movement processing.

As described above, in the map data generation processing, a GNSS is preferably used for an initial measurement of the stop absolute position. Moreover, as described above, it is desirable that the stopping position of the stopped vehicle 1a is set to a spot at which visibility of the GNSS satellites is good. Thus, by setting the stopping position to the spot at which visibility of the GNSS satellites is good, it is possible to generate map data not inclusive of accumulated errors and exert a beneficial effect that realizes generation of highly accurate map data, on a wide range of map generation.

Thus, since a GNSS is used for calculation of the stop absolute position and the stop absolute position is calculated with the vehicle 1a being stopped, thereby enabling stationary positioning, it is possible to acquire an absolute position with good measurement accuracy, as compared to a case where the vehicle 1 performs a GNSS positioning while it is moving.

Note that, for measurement of the mobile vehicle 1b, an RTK (Real Time Kinematic)-GPS (Global Positioning System) may be used. In this case, the stopped vehicle 1a becomes a base station and the mobile vehicle 1b becomes a mobile station.

In this case, the autonomous movement system 10 creates map data according to the following steps.

(1) Both the vehicle 1a as a base station and the vehicle 1b as a mobile station stop at positions where they can receive radio waves from the GPS satellites and communication between the vehicle 1a and the vehicle 1b is possible. At this time, it is desirable that the vehicle 1a and the vehicle 1b stop at an open location without multipath and perform positioning while remaining stopped for some time.

(2) When a position of the vehicle 1b is measured by means of the RTK-GPS, the function of the vehicle 1a and the function of the vehicle 1b are switched (namely, the vehicle 1b becomes a base station and the vehicle 1a becomes a mobile station). Then, a position of the vehicle 1a is measured by means of the RTK-GPS.

(3) With the vehicle 1b as a mobile vehicle, the processings of FIG. 2 and FIG. 7 are performed and thus one vehicle 1 calculates a relative position of the other vehicle 1.

In the RTK-GPS, when the mobile station (here, the vehicle 1b) fails to receive radio waves of the GPS while it is moving, a problem occurs in that positioning accuracy becomes extremely diminished.

Moreover, in the RTK-GPS, the mobile station and the base station (here, the vehicle 1a) have to be able to communicate with each other at all times. For this reason, position measurement by the RTK-GPS is not suited for creation of map data over a wide range.

Furthermore, the base station normally has a continuing need to remain immobile.

As described above, by combining the position measurement by the RTK-GPS with the relative position calculation according to the present embodiment, it is possible to continue the generation of map data based on the relative position calculation even if the mobile station (the mobile vehicle) fails to receive radio waves of the GPS while it is moving, or the mobile station and the base station become unable to communicate with each other.

Moreover, by replacing the mobile vehicle and the stopped vehicle with each other (FIG. 2, S112), the base station (the stopped vehicle) does not have a continuing need to remain immobile, thereby enabling generation of a wide range of map data.

Thus, by combining the RTK-GPS with the present embodiment, measurement of the stop absolute position with an accuracy of about a few centimeters becomes possible, and by setting a position at which the stopped vehicle stops, to a spot at which visibility of the GPS satellites is good, highly accurate map generation not inclusive of accumulated errors becomes possible.

Note that although in the present embodiment, the stopped vehicle 1a and the mobile vehicle 1b are replaced with each other when the stopped vehicle 1a becomes unable to measure the mobile vehicle 1b, such replacement does not have to be performed. In such a case, a configuration may be adopted in which after the stopped vehicle 1a moves to approach the mobile vehicle 1b, the stopped vehicle 1a stops at a predetermined location again and the mobile vehicle 1b acquires object shape data while moving again. In this case, the stopped vehicle 1a stops at a location where visibility of the GNSS satellites is good, stops at a location where position estimation using matching is possible, or calculates a self-position at the stop location based on a distance measured using an odometry and the stop absolute position obtained at step S101.

Alternatively, the vehicle 1a and the vehicle 1b may perform the processing according to the present embodiment while they are moving respectively. In this case, the vehicle 1a needs to calculate a relative position of the vehicle 1b while constantly calculating the absolute position of the self using the odometry or the like.

Moreover, the map data creation device 2 may be installed in the vehicle 1.

Note that, the stopped vehicle 1a remains the stopped vehicle 1a until the replacement at step S112 in FIG. 2 is performed, and the mobile vehicle 1b remains the mobile vehicle 1b until the replacement at step S112 in FIG. 2 is performed. Moreover, the mobile vehicle 1b continues to acquire the relative position transmitted from the stopped vehicle 1a even if the self moves at a location where it can receive an absolute position from the GNSS or the like. This is because there is a possibility that the absolute position acquired by the mobile vehicle 1b from the GNSS or the like contains an unpredictable large error under the influence of multipath (reflection on a building or a tree) or the ionosphere. In the present embodiment, since the stopped vehicle 1a calculates, while identifying, the relative position of the mobile vehicle 1b, it is imagined that an unpredictable error is hardly contained. Note that since the stopped vehicle 1a is stopping to enable stationary positioning as described above, it is possible to acquire an absolute position with good measurement accuracy, as compared to a case where the vehicle 1 performs a GNSS positioning while it is moving.

According to the present embodiment, even in locations where there are few objects having such a shape as can be used for matching with map data, it is possible to create highly accurate map data from the object shape data of measured peripheral objects, and thus to perform highly accurate self-localization to reach the destination.

Namely, according to the present embodiment, the in-car device 110 of the stopped vehicle 1a calculates the relative position of the mobile vehicle 1b that measures object shape data, relative to the stopped vehicle 1a, based on the stop absolute position of the self. This makes it possible to specify a stop absolute position of the mobile vehicle 1b based on the stop absolute position of the stopped vehicle 1a and the relative position of the mobile vehicle 1b. This enables creation of map data even in a location not suited for matching with map data.

REFERENCE SIGNS LIST

1 Vehicle (Autonomous movement apparatus)
1a Stopped vehicle (First autonomous movement apparatus)
1b Mobile vehicle (Second autonomous movement apparatus)
2 Management device (Map data creation device)
21 Transmitting/Receiving processing unit
22 Map updating unit
23 Display processing unit
24 Map data storage unit
110 In-car device (Autonomous movement control device)
111 Transmitting/Receiving (T/R) processing unit (Transmitting unit, Receiving unit)
112 Relative position calculation unit (Other-position measurement unit
113 Absolute position calculation unit (Self-position measurement unit)
114 Shape acquisition unit (Peripheral object shape measurement unit)
115 Extraction unit
116 Matching unit
117 Self-localization unit
118 Cruise control unit

The invention claimed is:

1. A map data creation device comprising:
a processor for creating first map data, the processor including a matching unit configured to receive initial map data from a management device, the first map data being used for autonomous movement by a first autonomous movement apparatus, a second autonomous movement apparatus and/or other autonomous movement apparatuses, wherein the first map data is created based on
position data of the second autonomous movement apparatus which exists around the first autonomous movement apparatus, the position data being measured by the first autonomous movement apparatus while the first autonomous movement apparatus is stationary,
object shape data of objects which exists around the second autonomous movement apparatus, the object shape data being measured by the second autonomous movement apparatus while the second autonomous movement apparatus is mobile and includes object shape data of one or more stationary objects and object shape data of one or more moving objects, and matching the object shape data with the initial map data;

wherein the map data creation device is further configured to:

calculate a first relative position, via a relative position calculation unit, of the first autonomous movement apparatus;

determine whether or not the second relative position of the second autonomous movement apparatus which has moved can be measured, wherein if the second relative position of the second autonomous movement apparatus cannot be measured, returning the second autonomous movement apparatus to a position at which the second relative position can be measured and replacing the first autonomous movement apparatus and the second autonomous movement apparatus with each other;

determine, via a map updating unit, whether or not each region of a plurality of regions of the first autonomous movement apparatus or the second autonomous movement apparatus are covered in the first map data; and calculating, when each region of the plurality of regions are not covered in the first map data and via an absolute position calculation unit of the second autonomous movement apparatus that has newly become a third stopped autonomous movement apparatus, a stop absolute position based on a first stop absolute position of the first autonomous movement apparatus before replacement and a relative position of the second autonomous movement apparatus.

2. The map data creation device according to claim 1, wherein the first autonomous movement apparatus includes:

a self-position measurement unit that measures a position of the self;

an other-position measurement unit that measures an other-position which is a position of the second autonomous movement apparatus, based on the position of the self; and a transmitting unit that transmits a measured other-position as the position data to the second autonomous movement apparatus, and the second autonomous movement apparatus includes:

a peripheral object shape measurement unit that measures a shape of an object around the self as the object shape data; and a receiving unit that receives the position data which is a transmitted other-position, and wherein a position in the map data created by the map data creation device is based on the other-position which is transmitted by the first autonomous movement apparatus to the second autonomous movement apparatus.

3. The map data creation device according to claim 2, wherein the position of the self is an absolute position of the self, and the other-position is a relative position of the second autonomous movement apparatus relative to the first autonomous movement apparatus, the relative position being calculated based on the absolute position of the self.

4. The map data creation device according to claim 3, wherein the absolute position of the self is a positioning data by a GNSS.

5. The map data creation device according to claim 3, wherein the other-position measurement unit calculates the relative position of the second autonomous movement apparatus based on the absolute position of the self and the object shape data around the self measured by the peripheral object shape measurement unit.

6. The map data creation device according to claim 3, wherein the other-position measurement unit calculates the relative position by calculating a distance and a direction of the second autonomous movement apparatus relative to the self.

7. The map data creation device according to claim 6, wherein the other-position measurement unit calculates the distance of the second autonomous movement apparatus relative to the self, based on the object shape data around the self measured by the peripheral object shape measurement unit.

8. The map data creation device according to claim 1, wherein the first map data creation device is provided in a manned mobile object other than the autonomous movement apparatuses, or a fixed equipment, or is provided in at least one of the autonomous movement apparatuses.

9. The map data creation device according to claim 1, wherein the object shape data around the self measured by the peripheral object shape measurement unit is information on distances of a plurality of measuring points, which are obtained as a result of scanning of laser beam.

10. The map data creation device according to claim 1, wherein matching the object shape data with the initial map data comprising using a Kalman filter.

11. The map data creation device according to claim 1, where the map creation device is configured to update an appearance frequency of the one or more moving objects at each location on the map data using the object shape data.

12. The map data creation device according to claim 1, further comprising a Global Navigation Satellite System configured to calculate a stop absolute position.

13. The map data creation device according to claim 1, further comprising a Real Time Kinematic-Global Positioning System (RTK-GPS).

14. An autonomous movement system comprising: a first autonomous movement apparatus including a self-position measurement unit that measures a position of the self, an other-position measurement unit that measures an other-position which is a position of an other autonomous movement apparatus that exists around the self, based on the position of the self, and a transmitting unit that transmits a measured other-position as position data to the other autonomous movement apparatus, and a second autonomous movement apparatus which is the other autonomous movement apparatus, including a peripheral object shape measurement unit that measures a shape of an object around the self as object shape data, and a receiving unit that receives the position data which is a transmitted other-position; and a map data creation device that creates first map data, the map creation device including a matching unit configured to receive initial map data from a management device, the first map data being used for autonomous movement by a first autonomous movement apparatus, a second autonomous movement apparatus and/or other autonomous movement apparatuses, the first map data is created based on position data of the second autonomous movement apparatus which exists around the first autonomous movement apparatus, the position data being measured by the first autonomous movement apparatus while the first autonomous movement apparatus is stationary, object shape data of objects which exists around the second autonomous movement apparatus, the object shape data being measured by the second autonomous movement apparatus while the second autonomous movement apparatus is mobile and includes object shape data of one or more stationary objects and object shape data of one or more moving objects, and matching the object shape data with the initial map data wherein the autonomous movement system is further configured to:

calculate a first relative position, via a relative position calculation unit, of the first autonomous movement apparatus;

determine whether or not the second relative position of the second autonomous movement apparatus which has moved can be measured, wherein if the second relative position of the second autonomous movement apparatus cannot be measured, returning the second autonomous movement apparatus to a position at which the second relative position can be measured and replacing the first autonomous movement apparatus and the second autonomous movement apparatus with each other;

determine, via a map updating unit, whether or not each region of a plurality of regions of the first autonomous movement apparatus or the second autonomous movement apparatus are covered in the first map data; and calculating, when each region of the plurality of regions are not covered in the first map data and via an absolute position calculation unit of the second autonomous movement apparatus that has newly become a third stopped autonomous movement apparatus, a stop absolute position based on a first stop absolute position of the first autonomous movement apparatus before replacement and a relative position of the second autonomous movement apparatus.

15. The autonomous movement system according to claim 14, wherein the position of the self is an absolute position of the self, and the other-position is a relative position of the second autonomous movement apparatus relative to the first autonomous movement apparatus, the relative position being calculated based on the absolute position of the self.

16. The autonomous movement system according to claim 15, wherein the absolute position of the self is a positioning data by a GNSS.

17. The autonomous movement system according to claim 15, wherein the other-position measurement unit calculates the relative position of the second autonomous movement apparatus based on the absolute position of the self and the object shape data around the self measured by the peripheral object shape measurement unit.

18. The autonomous movement system according to claim 15, wherein the other-position measurement unit calculates the relative position by calculating a distance and a direction of the second autonomous movement apparatus relative to the self.

19. The autonomous movement system according to claim 15, wherein the other-position measurement unit calculates the distance of the second autonomous movement apparatus relative to the self, based on the object shape data around the self measured by the peripheral object shape measurement unit.

20. The map data creation device according to claim 14, wherein the first map data creation device is provided in a manned mobile object other than the autonomous movement apparatuses, or a fixed equipment, or is provided in at least one of the autonomous movement apparatuses.

21. The map data creation device according to claim 14, wherein the object shape data around the self measured by the peripheral object shape measurement unit is information on distances of a plurality of measuring points, which are obtained as a result of scanning of laser beam.

22. The autonomous movement system according to claim 14, wherein matching the object shape data with the initial map data comprising using a Kalman filter.

23. The autonomous movement system according to claim 14, where the map creation device is configured to update an appearance frequency of the one or more moving objects at each location on the map data using the object shape data.

24. The map data creation device according to claim 14, wherein the map data creation device further comprises a Global Navigation Satellite System configured to calculate a stop absolute position.

25. The map data creation device according to claim 14, wherein the map data creation device further comprises Real Time Kinematic-Global Positioning System (RTK-GPS).

26. An autonomous movement control device which is installed in the autonomous movement apparatuses in the autonomous movement system described in claim 14, comprising: a function of the first autonomous movement apparatus; and a function of the second autonomous movement apparatus.

* * * * *